INVENTOR

NILS LENNART NILSSON

BY Hane, Baxley and Spiecens

ATTORNEYS

United States Patent

Nilsson

[15] 3,659,210

[45] Apr. 25, 1972

[54] PHASE DETECTION CIRCUIT

[72] Inventor: Nils Lennart Nilsson, Hisings Backa, Sweden

[73] Assignee: Telefonaktiebolaget LM Ericsson, Stockholm, Sweden

[22] Filed: Oct. 26, 1970

[21] Appl. No.: 83,879

[30] Foreign Application Priority Data

Nov. 6, 1969 Sweden ................................ 15211/69

[52] U.S. Cl. ............................ 328/134, 307/229, 307/232, 307/295, 324/83 Q, 328/140, 330/69

[51] Int. Cl. ............................................ H03d 13/00

[58] Field of Search .................. 328/133, 134, 140; 307/229, 307/232, 295; 324/83 Q; 330/69

[56] References Cited

UNITED STATES PATENTS 2,897,379 7/1959 Hinsdale ................................ 307/232
3,231,755 1/1966 Pascal ................................ 307/295
3,330,972 7/1967 Malan ................................ 328/133 X
3,446,996 5/1969 Toffler ................................ 328/140 X

*Primary Examiner*—Stanley T. Krawczewicz
*Attorney*—Hane, Baxley & Spiecens

[57] ABSTRACT

Phase detection circuit, which in the state of a voltage value indicates the difference between the phase of an incoming signal and the phase of a reference signal. The circuit is built up by an operational amplifier with two inputs, one of them inverting the phase of the incoming signal. The incoming signal is fed to both inputs of the amplifier, whereby the signal is fed to the not inverting input via a switch which is controlled by the reference signal in such a manner that it alternatively lets through and blocks up the incoming signal during every other half period of the reference signal. The amplifier is so dimensioned that the amplification of signals fed to the inverting input is as high or lower than the amplification of signals fed to the other input.

2 Claims, 12 Drawing Figures

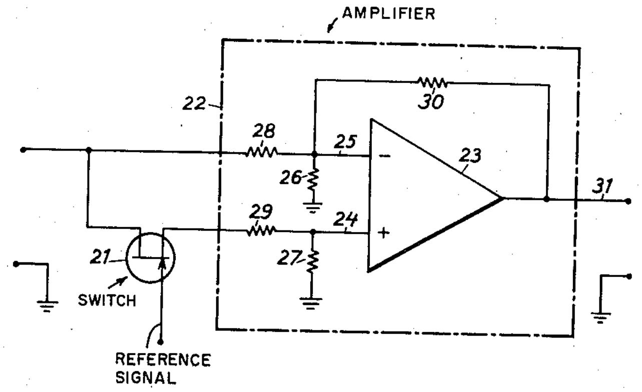

Figure 1:
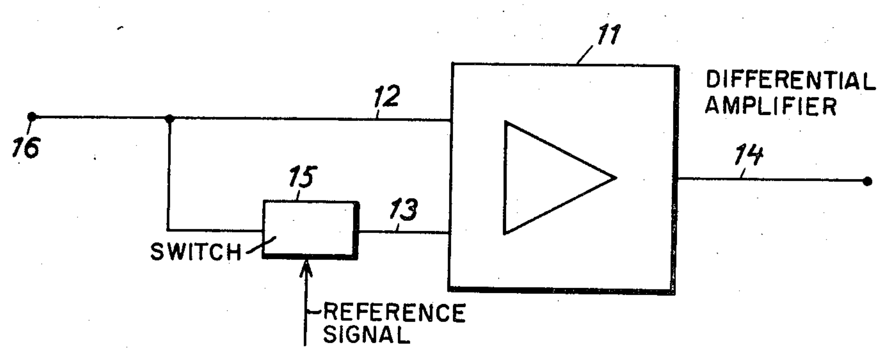

INVENTOR
NILS LENNART NILSSON
BY Hane, Baxley and Spiecens
ATTORNEYS

PHASE DETECTION CIRCUIT

The present invention relates to a full wave phase detection circuit which in the state of a voltage value indicates the difference between the phase of an incoming signal and the phase of a reference signal. The circuit comprises a differential amplifier with two inputs to which the incoming signal is intended to be fed in dependence of the reference signal, whereby the signal fed to the one input is phase inverted and added to the not phase inverted signal fed to the other input, so that at the output of the differential amplifier an output signal is obtained which is a measure of the phase shift of the incoming signal in comparison with the reference signal.

By building up a full wave phase detection circuit around an integrated differential amplifier, a circuit is obtained which is cheap in production and very reliable in operation, depending on the improvement and price reduction which the differential amplifiers available on the market have gone through during the last years. Such a circuit has very small dimensions as the differential amplifiers are in miniature. Such phase detection circuits have usually a switch connected in each of the input circuits of the differential amplifier. These switches are controlled by reference signals which between each other are 180° dephased.

The purpose of the present invention is to achieve a phase detection circuit of said type, which is less complicated than the earlier known arrangements and which gives an output signal with so small alternating-current component as is possible, for example for control of motors in a servo system. Thereby that it includes only one switch the circuit becomes more cheap in production.

The characteristics of the invention appear from the claim enclosed.

The invention will be explained with reference to the drawing enclosed in which

Figure 2:
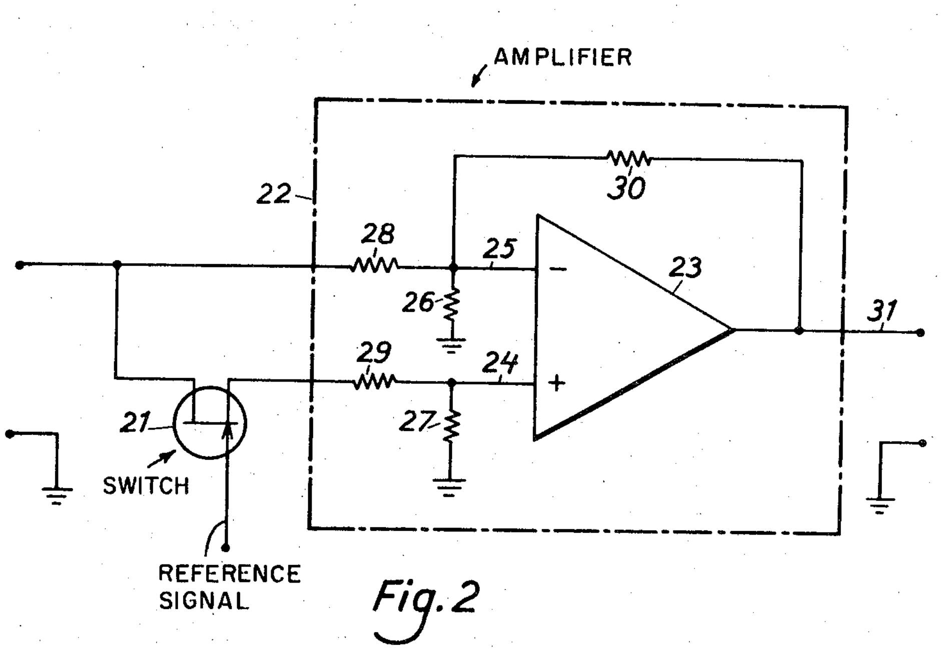

FIG. 1 schematically shows the principle of the invention in form of a block diagram and FIG. 2 shows an embodiment of an arrangement according to the invention.

FIGS. 3 and 4 show, as examples, the curve forms in different parts of a circuit according to the invention with two different values of the phase displacement between the incoming signal and the reference signal.

In FIG. 1 a differential amplifier is denoted by 11 and which amplifier has two inputs 12, 13 and an output 14. The differential amplifier is so built up that signals which are fed to the one input 13 only are amplified, while signals which are fed to the other input 12 are phase inverted and amplified. The two signals treated in this manner are then added and the sum signal appears on the output 14 of the differential amplifier in the state of an output signal. In a phase detection circuit according to the invention, the signal, the incoming signal, which is to be phase detected, is fed direct from the input 16 of the phase detection circuit to the phase inverting input 12 of the differential amplifier. To the not phase inverting input 13 the incoming signal is fed via a switch 15, which is controlled by a reference signal with the same frequency as the frequency of the incoming signal.

The differential amplifier 11 is according to the example dimensioned in such a manner that the amplification from the input 12 to which the incoming signal is fed direct, is half as high as the amplification from the input 13 to which the incoming signal is fed via said switch 15. Said amplification need not necessarily to be half as high but can be considerably lower or the amplifications can be as high, but if this value is chosen this entails the advantage that the alternating-current component in the output signal will have the lowest possible value. This is assumed to be the case in the following description.

The switch 15 is controlled by the reference signal, Ref, in such a manner that it alternatively lets through and blocks up the incoming signal during every other half period of the reference signal.

Figure 3A:
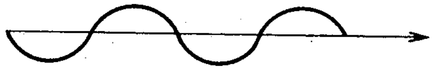
Figure 3B:
Figure 3C:
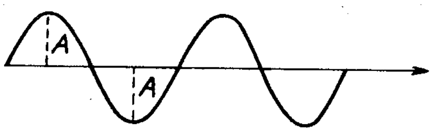
Figure 3D:
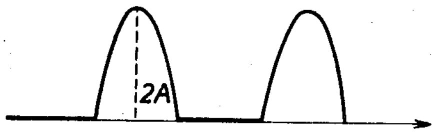
Figure 3E:

The function of a phase detection circuit according to the invention can by means of an example briefly be explained like this: The incoming signal is assumed to be a sine signal (FIG. 3*a*) and the reference signal, which to begin with is assumed to be in phase with the incoming signal (FIG. 3*b*), is such that the switch is closed during the positive half period of the incoming signal and closed during the negative half period. The incoming signal is fed direct to the input via which the differential amplifier phase inverts the signal and on the output, during the half period when the switch is closed, a signal will appear in the state of a positive sine half wave with a largest amplitude value A (FIG 3*c*) which depends on the amplification. During the half period when the switch is closed, from the phase inverting part of the differential amplifier, if at the moment is disregarded from the signal from the other part of the differential amplifier, a signal will appear on the output 14 in the state of a negative sine half-wave with the largest amplitude value A (FIG. 3*c*). During this half period will, from the other part of the differential amplifier, a positive sine half-wave appear with a largest amplitude value which is twice as large as the value A, i.e., 2A (FIG. 3*d*). When these signals are added will at the output, when the switch is closed, a sine half-wave appear which is the sum of these two signals, i.e., a positive half-wave with the largest amplitude A (FIG. 3*e*). The signal on the output becomes consequently, according to the example, the same during the positive and negative half periods of the incoming signal. In the case the switch is closed during the positive half period of the incoming signal and open during the negative, is consequently, in comparison with the incoming signal, a full wave rectified signal obtained on the output of the amplifier.

Figure 4A:
Figure 4B:
Figure 4C:
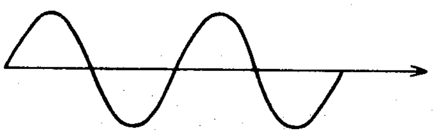
Figure 4D:
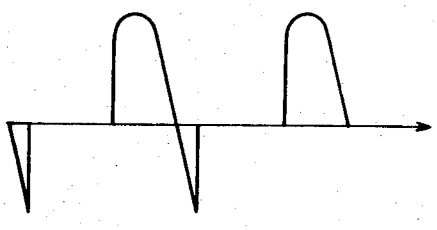
Figure 4E:
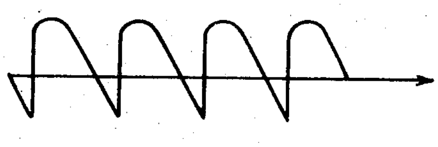

The DC-voltage average of the output signal becomes consequently largest when the reference signal is in phase with the incoming signal. If the incoming signal is dephased in comparison with the reference signal, the DC-voltage average will reduce with the phase displacement, which is indicated for for example a phase displacement of 45° in FIG. 4*a*–4*e*, and will at last be zero when a phase displacement of 90° is obtained between the incoming signal and the reference signal. FIG. 4*a* shows the incoming signal, which is dephased 45° in comparison with the reference signal, which is shown in FIG. 4*b*. FIG. 4*c* shows the signal from the phase inverting input of the differential amplifier before addition. FIG. 4*d* shows the signal from the other input before addition and FIG. 4*e* shows the resulting output signal, the DC-voltage average of which is an indication of the phase displacement. If the phase displacement increases still more, the DC-voltage average becomes negative. At a phase displacement of 180° the DC-voltage average is as large as at a phase displacement of 0°, though with inverted sign.

In FIG. 2 an embodiment of a phase detection circuit according to the invention is shown, where the switch 21 is electronic and consists of for example a field effect transistor. Moreover is shown how the amplifier 22 is connected with use of a type of integrated operation amplifier with differential inputs usually occurring on the market. Such an operation amplifier has an output 31 and two inputs 24, 25, of which one is phase inverting. Moreover it has usually a "raw"-amplification of the size 100.000, which is as large for both the inputs. In this embodiment the operation amplifier 23 is by means of resistances 26–30 connected so that the signal on the input 24 to which the switch 21 is connected, is amplified four times and the signal on the other input 25 is amplified twice and phase inverted. This is realized for example thereby that two input resistances 28, 29 are connected to the operation amplifier, one to each of the inputs. Moreover the operation amplifier is fed-back by means of a resistance 30, connected between the output 31 and the phase inverting input 25. The inputs 24, 25 of the operation amplifier are each via a resistance 26 and 27 respectively connected to the potential, for example earth potential, in comparison with which the incoming signal and the output signal are measured. The reference signal source, Ref, is connected to the gate of the field effect transistor 21 and the drain-source of the transistor are connected in series with the one input resistance 29. In order to get fourfold amplification from input 24 to which the field effect transistor 21 is connected and twofold amplification from the other input 25, the relation between the resistances 26-30 is to be the following: If the input resistance 29 in series with the transistor 21 is assumed to have the resistance R ohm, the other input resistance 28 will have the resistance 3 R ohm. The two resistances 26, 27, which connect the inputs of the operation amplifier to earth potential, has the resistance 2 R ohm and the feed-back resistance 30 has the resistance 6 R ohm.

As an example of dimensioning can be mentioned that a suitable value of the above used resistance value R is 5.000 ohm.

Besides a field effect transistor can as a switch in an arrangement according to the invention also be used a usual transistor, an electromagnetic relay or the like. The switch can besides being connected as earlier is described, also be connected so that when it is closed, the signal which is fed to the one input of the differential amplifier is short-circuited and it is during the time the switch is open, signal is fed to said input. In this case a resistance is connected between the input of the phase detection circuit and the switch in order not to influence the other input of the differential amplifier by short-circuiting. Moreover the switch can also be connected to the input of the differential amplifier via which the incoming signal is phase inverted. Whereby it is via the not phase inverting input, the amplification is to be as high or lower than the amplification via the phase inverting input.

We claim:

1. Phase detection circuit with an input (16) and an output (14), which circuit in the state of a voltage value indicates the difference between the phase of an incoming signal and the phase of a reference signal, comprising a differential amplifier (11) with two inputs (12,13) to which the incoming signal is indicated to be fed depending on the reference signal (Ref), whereby the differential amplifier is arranged to phase invert the signal fed to the one input (12), after which the phase inverted signal is added to the not phase inverted signal fed to the other input (13), so that on the output (14) of the differential amplifier (11) an output signal is obtained, which is a measure of the phase shift of the incoming signal in comparison with the reference signal (Ref), and in which circuit said one input (12) of the differential amplifier (11) is connected direct to the input (16) of the phase detection circuit, while said other input (13) of the differential amplifier (11) is connected to the input (16) of the phase detection circuit via a switch (15) which is controlled by the reference signal (Ref) in such a manner that it alternatively lets through and blocks up the incoming signal during every other half period of the reference signal (Ref), whereby the differential amplifier (11) is dimensioned in such a manner, that the amplification of signals fed to said one input (12) is as high or lower than the amplification of signals fed to said switch (15) and said other input (13).

2. Phase detection circuit according to claim 1, in which the amplification of signals fed to said one input (12) is half as high as the amplification of signals fed to said other input (13).

* * * * *